(12) United States Patent
Long et al.

(10) Patent No.: US 11,824,610 B2
(45) Date of Patent: Nov. 21, 2023

(54) CALCULATION OF BEAMFORMING WEIGHTS FOR RECIPROCITY BASED BEAMFORMING WITHOUT UE TRANSMIT ANTENNA SELECTION

(71) Applicants: TELEFONAKTIEBOLAGET LM ERICSSON (PUBL), Stockholm (SE); Jianguo Long, Kanata (CA); Yongquan Qiang, Ottawa (CA)

(72) Inventors: Jianguo Long, Kanata (CA); Yongquan Qiang, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/615,630

(22) PCT Filed: Jun. 21, 2019

(86) PCT No.: PCT/IB2019/055268
§ 371 (c)(1),
(2) Date: Dec. 1, 2021

(87) PCT Pub. No.: WO2020/254867
PCT Pub. Date: Dec. 24, 2020

(65) Prior Publication Data
US 2022/0311496 A1  Sep. 29, 2022

(51) Int. Cl.
*H04B 7/02*       (2018.01)
*H04B 7/06*       (2006.01)
*H04B 7/0456*     (2017.01)

(52) U.S. Cl.
CPC ......... *H04B 7/0639* (2013.01); *H04B 7/0456* (2013.01); *H04B 7/068* (2013.01); *H04B 7/0617* (2013.01)

(58) Field of Classification Search
CPC .. H04B 7/0639; H04B 7/0456; H04B 7/0617; H04B 7/068
USPC ................ 375/267, 261, 259, 219, 295, 316
See application file for complete search history.

(56) References Cited

U.S. PATENT DOCUMENTS

| 2010/0035627 A1* | 2/2010 | Hou ...................... H04B 7/024 |
| | | 455/452.2 |
| 2011/0116432 A1* | 5/2011 | Doppler ............... H04B 7/2606 |
| | | 370/312 |

OTHER PUBLICATIONS

3GPP "3rd Generation Partnership Project; Technical Specification Group Radio Access Network; Evolved Universal Terrestrial Radio Access (E-UTRA); Physical layer procedures, TS 36.213 V14.0.0 Sep. 2016, pp. 1-406, (Release 14)". https://portal.3gpp.org/desktopmodules/Specifications/SpecificationDetails.aspx?specificationId=2427.

(Continued)

*Primary Examiner* — Zewdu A Kassa
(74) *Attorney, Agent, or Firm* — Ericsson Canada Inc.

(57) ABSTRACT

Embodiments of a method in a base station configured to transmit and receive wireless signals to and from a user equipment, UE. A downlink channel response of a first UE antenna is determined, based on uplink signals received from the UE. First preceding weights are calculated based on the determined channel response of the first UE antenna. Orthogonal or quasi-orthogonal preceding weights are determined based on the first preceding weights. First and second downlink signal layers are transmitted using the first preceding weights and the orthogonal or quasi-orthogonal preceding weights.

16 Claims, 5 Drawing Sheets

(56) References Cited

OTHER PUBLICATIONS

3GPP, "3rd Generation Partnership Project; Technical Specification Group Radio Access Network; NR; Physical layer procedures for data" TS 38.214 V2.0.0, Dec. 2017, pp. 1-71, (Release 15) https://portal.3gpp.org/desktopmodules/Specifications/SpecificationDetails.aspx?specificationId=3216.

Q. Gao et al., "Utilization of Channel Reciprocity in Advanced MIMO System". System and Standard Department, Datang Mobile Communications Equipment Co., Ltd., Jan. 2011, pp. 1-5, IEEE, Beijing, China.

X. Gao, O. Edfors, F. Rusek, and F. Tufvesson, "Linear pre-coding performance in measured very-large MIMO channels," in Proceedings of IEEE Vehicular Technology Conference (VTC-Fall), pp. 1-5, May 2011.

International Search Report and Written Opinion issued on PCT/IB2019/055268.

\* cited by examiner

US 11,824,610 B2

CALCULATION OF BEAMFORMING WEIGHTS FOR RECIPROCITY BASED BEAMFORMING WITHOUT UE TRANSMIT ANTENNA SELECTION

TECHNICAL FIELD

The present disclosure relates to wireless communications systems, and more particularly to calculation of beamforming weights for reciprocity based beamforming without UE transmit antenna selection.

BACKGROUND

Reciprocity based massive MIMO has attracted more and more attention in LTE advanced and 5G systems. Massive MIMO exploits the use of large antenna arrays at wireless base stations to simultaneously serve a large number of autonomous terminals through spatial multiplexing and beamforming. In time division duplex (TDD) systems where channel reciprocity holds, instantaneous channel state information (CSI) can be acquired on the base station based on uplink channel reference signals; subsequently, acquired uplink channel information is used by base stations to compute downlink beamforming weights. Reciprocity of uplink-downlink propagation is essential to the success of reciprocity-based downlink beamforming. Most UEs used in LTE or 5G are equipped with multiple receive antennas. To get full channel information on base stations, uplink reference signals need to be transmitted over all antennas. Transmitting reference signals simultaneously over all antennas needs multiple RF chains associated with multiple antennas which is costly in terms of size, power and hardware. A relative low-cost low-complexity alternative is transmit antenna selection or antenna switching, i.e., uplink reference signals are alternatively transmitted over each of antennas. The base station can then acquire full channel information once all antennas are sounded. However, even this relative low-cost low-complexity solution has some additional costs and is not supported by all UEs. In fact, currently no commercial LTE UEs support antenna selection. And this will be the case also for 5G UEs at least at early stage of 5G deployment.

SUMMARY

An aspect of the present invention provides a method in a base station configured to transmit and receive wireless signals to and from a user equipment, UE. A downlink channel response of a first UE antenna is determined, based on uplink signals received from the UE. First precoding weights are calculated based on the determined channel response of the first UE antenna. Orthogonal or quasi-orthogonal precoding weights are determined based on the first precoding weights. First and second downlink signal layers are transmitted using the first precoding weights and the orthogonal or quasi-orthogonal precoding weights.

Embodiments of a base station, and a machine readable storage medium containing software instructions for controlling at least one processor in a base station are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

Figure 1:
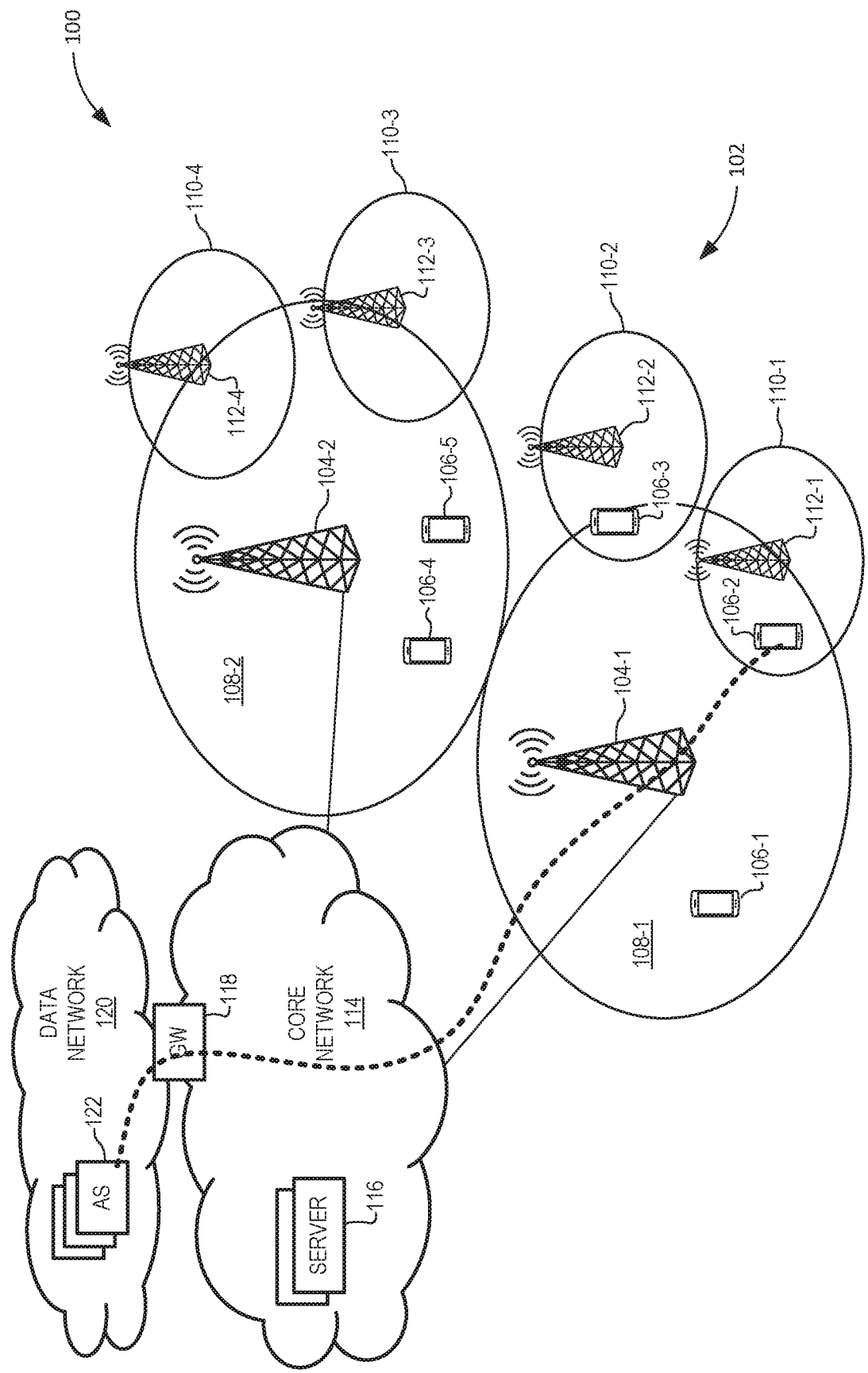
FIG. 1 is a block diagram schematically illustrating a representative network in which embodiments of the present invention may be deployed.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.
2D Two Dimensional
3GPP Third Generation Partnership Project
5G Fifth Generation
AAS Antenna Array System
AoA Angle of Arrival
AoD Angle of Departure
ASIC Application Specific Integrated Circuit
BF Beamforming
BLER Block Error Rate
BW Beamwidth
CPU Central Processing Unit
CSI Channel State Information
dB Decibel
DCI Downlink Control Information
DFT Discrete Fourier Transform
DSP Digital Signal Processor
eNB Enhanced or Evolved Node B
FIR Finite Impulse Response
FPGA Field Programmable Gate Array
gNB New Radio Base Station
ICC Information Carrying Capacity
IIR Infinite Impulse Response
LTE Long Term Evolution
MIMO Multiple Input Multiple Output
MME Mobility Management Entity
MMSE Minimum Mean Square Error
MTC Machine Type Communication
NR New Radio
OTT Over-the-Top
PBCH Physical Broadcast Channel PDCCH Physical Downlink Control Channel
PDSCH Physical Downlink Shared Channel
P-GW Packet Data Network Gateway
RAM Random Access Memory
ROM Read Only Memory
RRC Radio Resource Control
RRH Remote Radio Head
SCEF Service Capability Exposure Function
SINR Signal to Interference plus Noise Ratio
TBS Transmission Block Size
UE User Equipment
ULA Uniform Linear Array
URA Uniform Rectangular Array Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various technical standards (such as 3GPP TS 38.211 V15.1.0 (2018-03) and 3GPP TS 38.214 V15.1.0 (2018-03), for example) should be understood to refer to the specific version(s) of such standard(s) that is(were) current at the time the present application was filed, and may also refer to applicable counterparts and successors of such versions.

The description herein focuses on a 3GPP cellular communications system and, as such, 3GPP terminology or terminology similar to 3GPP terminology is oftentimes used. However, the concepts disclosed herein are not limited to a 3GPP system.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4,106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: Evolved Node B (eNB) systems (known, for example, in the 3GPP standards): WiFi access points (known, for example from IEEE 802.11 standards) or the like. In some contexts, a base station 104 may be referred to as an access point (AP) regardless of the Radio Access Technology (RAT) that it supports.

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WiFi access points or the like. In some contexts, a low power node 112 may be referred to as an access point (AP) regardless of the specific Radio Access Technology (RAT) that it supports.

Notably, while not illustrated, a particular small cell 110 may alternatively be controlled by a base station 104, for example using a beam-forming technique. In such cases, the particular small cell 110 will not be associated with a respective low power node 112 per se. Rather, the particular small cell 110 will be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018-06) "System Architecture for the 5G System" and its successors. The CN 114 also includes one or more gateway (GW) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers (ASs) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
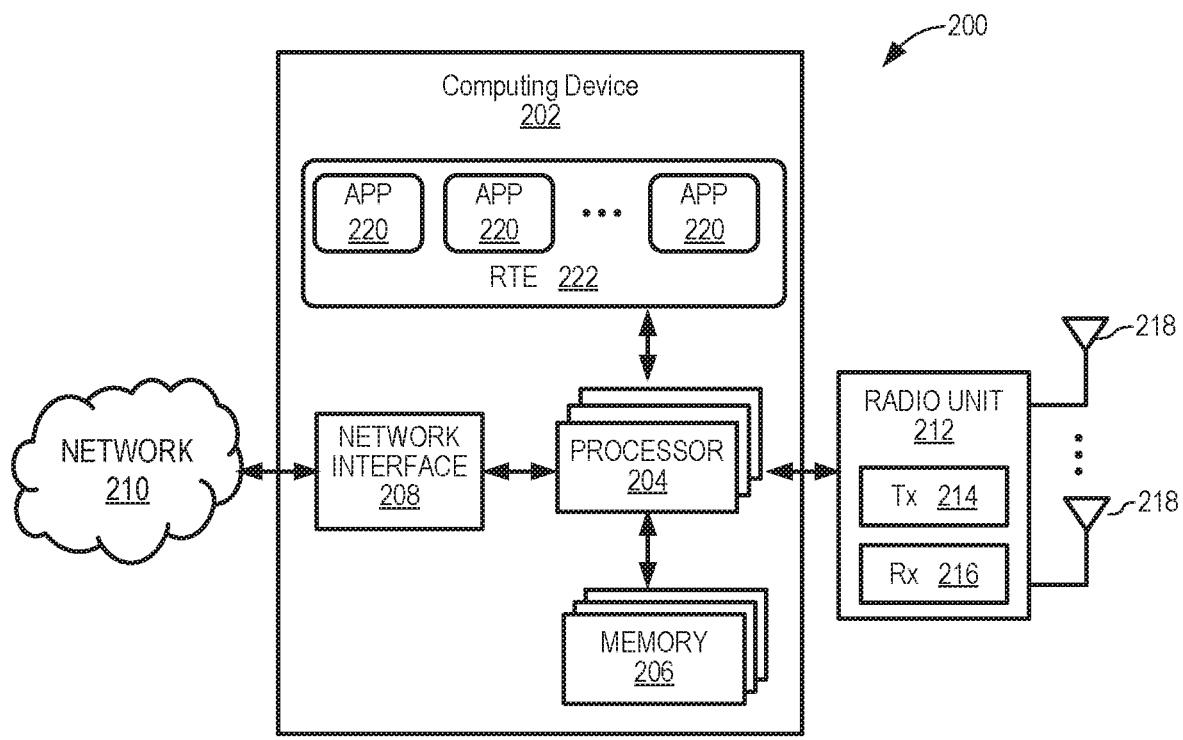
FIGS. 2A and 2B are block diagrams schematically illustrating examples of a computing device usable in embodiments of the present invention.
Figure 2B:
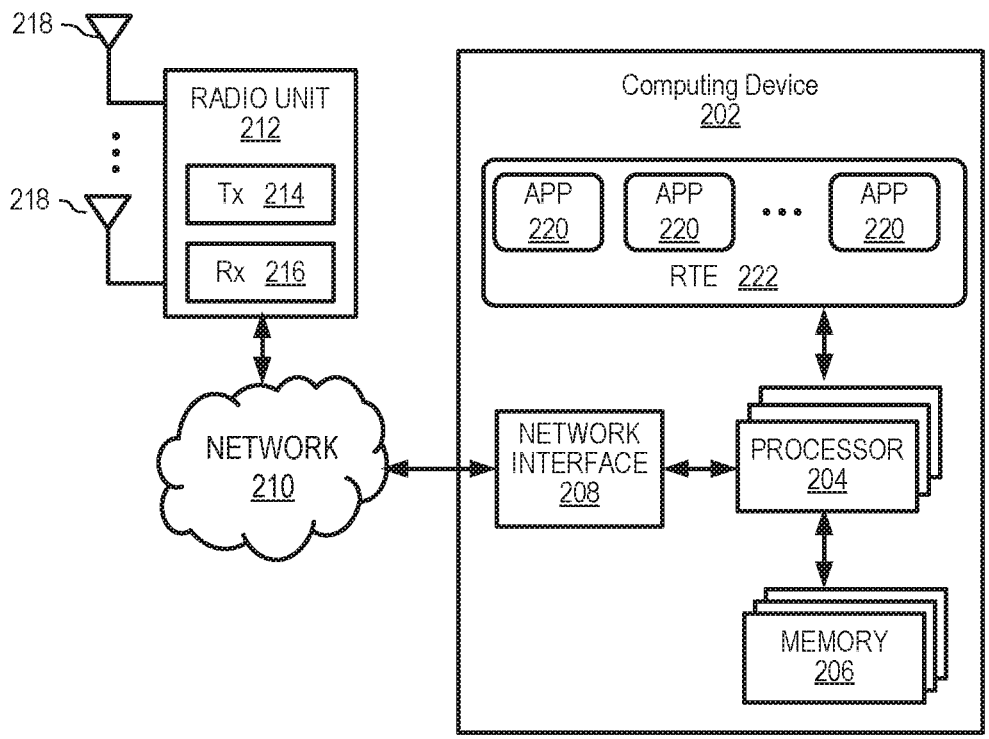

FIGS. 2A and 2B are block diagrams schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118, and/or any or all network functions may be implemented by suitable software executing within a computing device 202 or within a data center (non shown) composed of multiple computing devices 202.

In the example of FIG. 2A, the communications system 200 generally includes computing device 202 connected to one or more networks 210 and one or more radio units 212. The computing device 202 includes one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate one or more processors 204, a memory 206, and one or more radio units 212, but may exclude a network interface 208. Conversely, a computing device 202 configured to implement a server 116 or 122 may include one or more processors 204, a memory 206, and one or more network interfaces 208, but may exclude radio units 212. A computing device 202 configured to implement a base station 104 or 112, on the other hand, will normally include one or more processors 204, a memory 206, and both radio units 212 and network interfaces 208.

Figure 3:
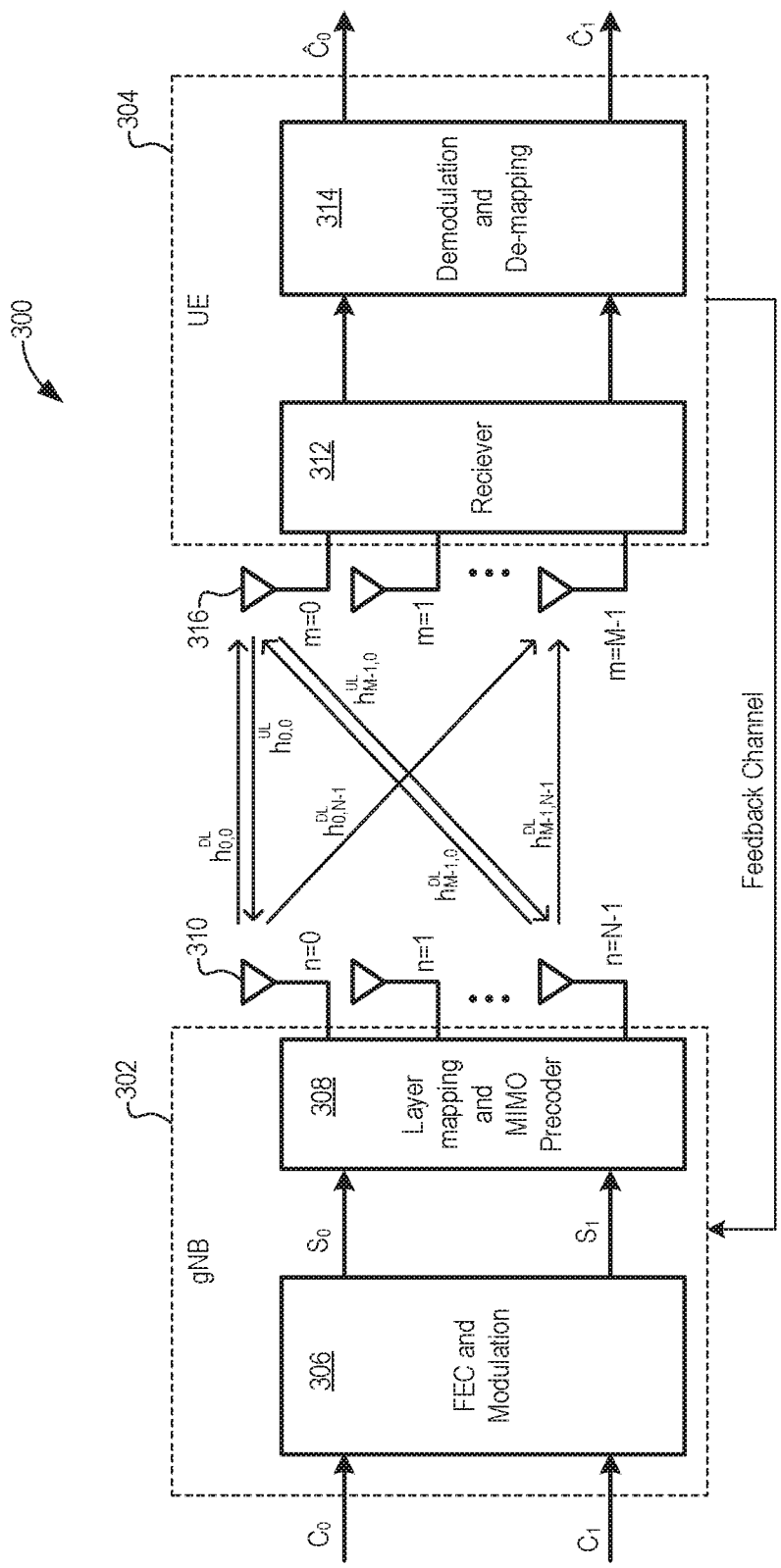
FIG. 3 is a block diagram illustrating elements of a system in accordance with a representative embodiment of the present invention.

FIG. 3 illustrates an example TDD MIMO system 300, which generally comprises a base station 302 and a user equipment (UE) 304. In the illustrated example, the base station 302 includes a forward error correction (FEC) and modulation block 306, cascaded with a Downlink signal layer mapping and MIMO precoder block 308. The base station is equipped with N antennas 310, which may be referenced by index values n=0 . . . (N−1). In the illustrated example, the UE 304 includes a receiver block 312, cascaded with a Demodulation and De-mapping block 314. The UE is equipped with M antennas 316, which may be referenced by index values m=0 . . . (M−1). A downlink signal received by the UE can be expressed as:

$$y = HWx + n$$

where y is the M×1 receive signal;

$H^{DL} = [h_{mn}^{DL}]$ is the M×N downlink channel matrix; the element $h_{mn}^{DL}$ of $H^{DL}$ represents the channel coefficient from the $n^{th}$ gNB transmit antenna to the $m^{th}$ UE receive antenna. The $m^{th}$ row vector of $H^{DL}$ may be denoted as $H_m^{DL} = [h_{m0}^{DL} \ h_{m1}^{DL} \ \ldots \ h_{mN-1}^{DL}]$;

W is the N×L precoding matrix, L is the number of downlink signal layers. In some embodiments, L≤2;

x is L×1 modulated transmit signal vector;

n is the M×1 noise vector, n∼N(0, σ²I); and

σ is the standard deviation of the noise vector n.

Figure 4:
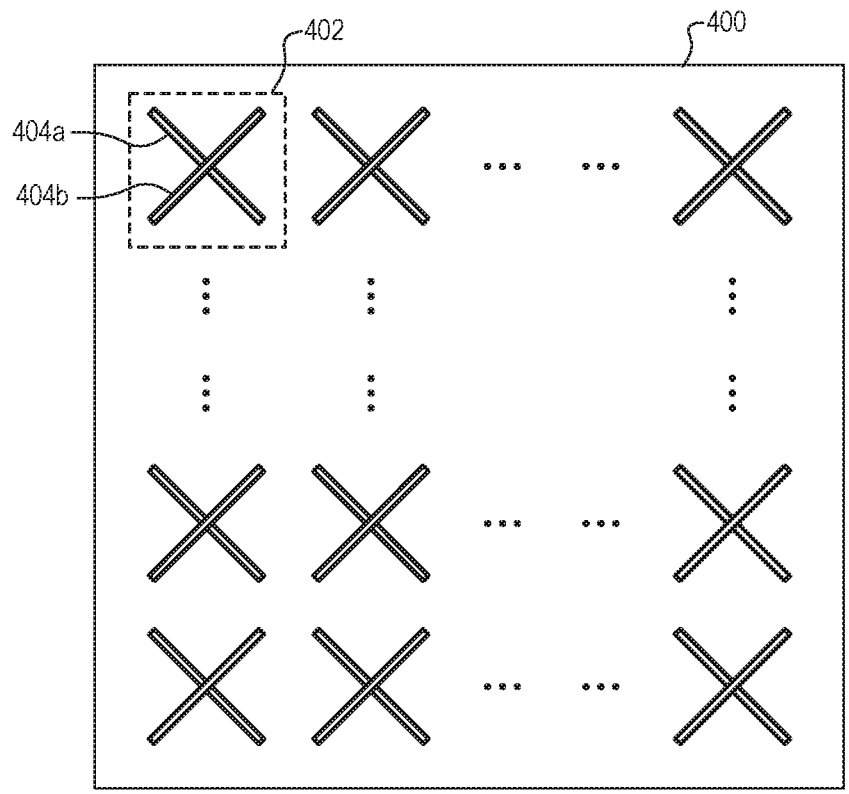
FIG. 4 is a block diagram illustrating elements of an example antenna array usable in embodiments of the present invention.

Each antenna 310 in the base station 302 is usually a two-dimensional (2D) active antenna system (AAS). As may be seen in FIG. 4, a 2D directional antenna array 400 may be composed of $N_1$ rows, and $N_2$ columns of antenna units 402, each of which includes a pair of cross-polarized) antenna elements 404a and 404b, so that the total number of transmit antennas is $N = 2N_1N_2$.

When a UE antenna m is capable of transmitting an uplink signal, the uplink channel coefficient between UE antenna m and a given base station antenna n, $h_{nm}^{UL}$, can be measured and estimated by the based station. The corresponding downlink channel $h_{mn}^{DL}$ can be obtained by setting $h_{mn}^{DL} = h_{nm}^{UL}$, as reciprocity holds in TDD systems. If uplink signals can be transmitted over all UE antennas 316, then the whole downlink channel response can be obtained from the uplink, i.e., $H^{DL} = H^{UL^T}$, where $(\cdot)^T$ is the transpose operator, $H_{UL} = [H_0^{UL} \ H_1^{UL} \ \ldots \ H_{M-1}^{UL}]$ and $H_m^{UL}$ is the mth column vector of $H^{UL}$, $H_m^{UL} = [h_{0m}^{UL} \ h_{1m}^{UL} \ \ldots \ h_{N-1,m}^{UL}]^T$. However, if only one UE antenna 316 (such as UE antenna m=0, for example) can transmit, the base station can only have knowledge of $H_0^{DL} = H_0^{UL^T}$. Other channels are unknown to base station.

When antenna selection is not supported by UEs, the base station 302 can only measure uplink channel of the one UE antenna that is capable of transmitting. This channel may be denoted as $H_{sounded}^{UL}$, and $H_0^{UL} = H_{sounded}^{UL}$. To mitigate this issue, one solution is to construct channel information for the other (non-transmitting) UE antennas 316 so that the constructed channels are orthogonal to $H_{sounded}^{UL}$. Let $H_{constructed}^{UL}$ be the constructed channel. The downlink channel obtained by this partially measured and partially constructed technique can be expressed as:

$$H^{DL} = [H_{sounded}^{UL}, H_{constructed}^{UL}]^T$$

where $(\cdot)^H$ is the Hermitian function;

The DL beamforming precoding weights can be calculated based on $H^{DL}$ using any suitable beamforming algorithm, such as minimum mean square error (MMSE) beamforming, for example. In that case, the precoding weights can be expressed as:

$$W = H^{DL^H}[H^{DL}H^{DL^H} + \sigma^2 I]^{-1}.$$

However, weights estimated based on constructed channels are not accurate in general. The performance degradation is observed when they are used for beamforming. Any downlink signal layer mapped to the weights from a constructed channel has much worse performance than a downlink signal layer mapped using the weights for sounded channel(s) based on RS measurement. This is because, first, there is a lack of diversity as only the downlink signal layer(s) mapped to the weights of constructed channels suffer all the channel estimation errors associated with those constructed channels; second, link adaptation tends to perform poorly for the downlink signal layer(s) mapped to the weights of constructed channels because the channel estimation errors are unpredictable; third, the downlink signal layer(s) mapped to the weights of the sounded channel may reach peak throughput with extra power wasted and not utilized by the downlink signal layer(s) mapped to the weights of constructed channels.

Another drawback to first construct unsounded channels and then to calculate precoding weights is that it is not computational and memory efficient as constructed channels need to be saved and used later.

Systems and methods are disclosed herein that provide techniques to calculate beamforming weights for massive MIMO systems without UE transmit antenna selection. It further comprises Measuring the channel response with UL reference signals from UE's main TX antenna without antenna selection transmit.

Calculating the precoding weights for the first downlink signal layer with measured channel response.

Generating orthogonal or quasi-orthogonal precoding weights for the second downlink signal layers based on measured channel response and/or the calculated weights for first downlink signal layer.

Performing precoding weights toggling between the first and second downlink signal layers in granularity of predefined sub-band.

Advantages of the present invention may include:

Generating orthogonal or quasi-orthogonal weights directly for unsounded downlink signal layers is a more computational and memory efficient solution compared to channel construction approach for unsounded channels.

Precoding weights toggling provides additional precoding diversity to two downlink signal layers to achieve balanced performances between the two downlink signal layers, which results in high throughputs and better controlled BLER overall.

Figure 5:
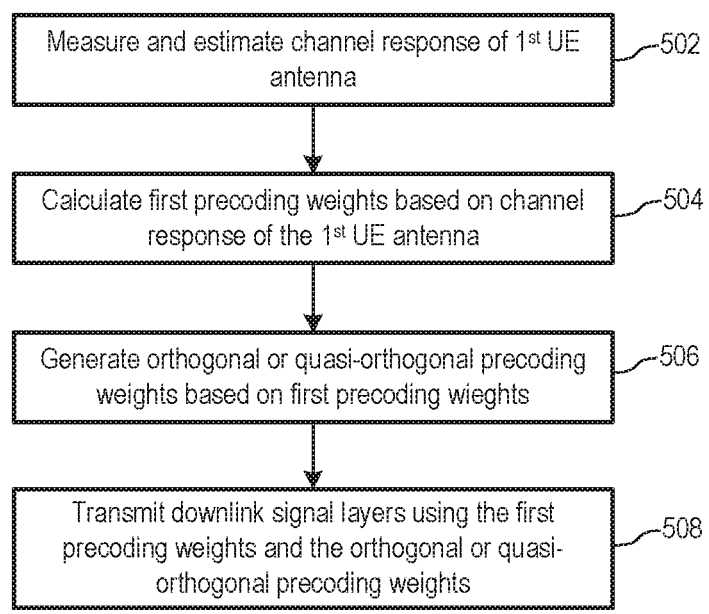
FIG. 5 is a flow chart showing steps of a process in accordance with a representative embodiment of the present invention.

The following paragraphs describe a method to generate precoding weights for massive MIMO systems in which each UE has only one transmit antenna. The method is illustrated by FIG. 5.

In a first step 502, the channel response $H_0^{DL}$ for the $1^{st}$ (i.e. the sounded) UE antenna is estimated. As stated previously, when the UE 304 can transmit only with one antenna 316, the base station 302 can only measure the uplink channel $H_0^{DL}$ between the one transmitting UE antenna and the base station. Based on the measured uplink channel $H_0^{UL}$, the corresponding downlink channel response $H_0^{DL}$ for the $1^{st}$ antenna can be estimated using known methods. The corresponding precoding weights of the 1st downlink signal layer in downlink transmission can then be accurately calculated (at 504) based on the downlink channel estimate $H_0^{DL}$.

In embodiments in which the downlink transmission rank is higher than 1 (that is, the base station has more than one downlink signal layer to send to the UE) we need to calculate precoding weights $W_m$ for each of the other downlink signal layers.

In embodiments of the present invention, a set of orthogonal or quasi-orthogonal weights can be generated (at 506) directly based on either one or both of the channel response $H_0^{DL}$ for the sounded antenna or the first precoding weights $W_0$, i.e., $W_{m>0}=f(H_0^{DL}, W_0)$, where $f(\cdot)$ is a function.

Let us express the channel response of the $1^{st}$ UE antenna (that is, the sounded antenna) as:

$$H_0^{DL}=[H_{0,p0}\ H_{0,p1}]$$

Where $H_{0,p0}$ and $H_{0,p1}$ are the channel coefficients for the base station transmit antennas of 1st polarization and 2nd polarization respectively.

One example method to generate orthogonal precoding weights is as follows. The first precoding weights can be represented as an MMSE transmit precoding (beamforming) weight vector calculated as $$W_0 = H_0^{DL^H}\left(H_0^{DL}H_0^{DL^H}+\sigma^2\right)^{-1} = \begin{bmatrix} \dfrac{H_{0,p0}^H}{H_{0,p0}H_{0,p0}^H + H_{0,p0}H_{0,p0}^H + \sigma^2} \\ \dfrac{H_{0,p1}^H}{H_{0,p0}H_{0,p0}^H + H_{0,p0}H_{0,p0}^H + \sigma^2} \end{bmatrix}$$

The orthogonal precoding weights can then be represented as a beamforming weight vector $W_1$, which is orthogonal to $W_0$, can then be generated as $$W_1 = \begin{bmatrix} \dfrac{-c*H_{0,p1}^H}{H_{0,p0}H_{0,p0}^H + c*H_{0,p0}H_{0,p0}^H + \sigma^2} \\ \dfrac{H_{0,p0}^H}{H_{0,p0}H_{0,p0}^H + c*H_{0,p0}H_{0,p0}^H + \sigma^2} \end{bmatrix}$$

where $$c = -\dfrac{H_{0,p1}^* H_{0,p0}}{H_{0,p0}^* H_{0,p1}};$$

and $(\cdot)^*$ is complex conjugate operator.

For the MMSE transmit beamforming weights $W_0$ above or the precoding weights generated with any other beamforming algorithm such as grid of beams (GoB) or eigen based beamforming (EBB), we can also generate a corresponding quasi-orthogonal weight vector $W_1$. For example, when $W_0$ is expressed as:

$$W_0 = \begin{bmatrix} V_0 \\ V_1 \end{bmatrix},$$

the quasi-orthogonal precoding weight vector $W_1$ can be defined as $$W_1 = \begin{bmatrix} V_0 \\ -V_1 \end{bmatrix}.$$

where $V_0$ and $V_1$ are the precoding weights for the first transmission layer over the base station transmit antennas of 1st polarization and 2nd polarization respectively Another example to construct quasi-orthogonal weight vector, used in GoB beamforming, is to express $W_0$ as $$W_0 = \dfrac{1}{\sqrt{2}}\begin{bmatrix} V \\ V\varphi_l \end{bmatrix} = \begin{bmatrix} V & 0 \\ 0 & V \end{bmatrix}\begin{bmatrix} 1 \\ \varphi_l \end{bmatrix},$$

then the quasi-orthogonal precoding weight vector $W_1$ can be defined as $$W_1 = \dfrac{1}{\sqrt{2}}\begin{bmatrix} V \\ -V\varphi_l \end{bmatrix} = \begin{bmatrix} V & 0 \\ 0 & V \end{bmatrix}\begin{bmatrix} 1 \\ -\varphi_l \end{bmatrix}.$$

where

V is the precoding weight of first downlink signal layer per polarization; and $\varphi_l$ is the co-phasing factor of two polarizations.

Once the first precoding weights and the orthogonal or quasi-orthogonal precoding weights have been generated, they can be used for transmitting (at 508) the first and second (and any other) downlink signal layers.

Figure 6:
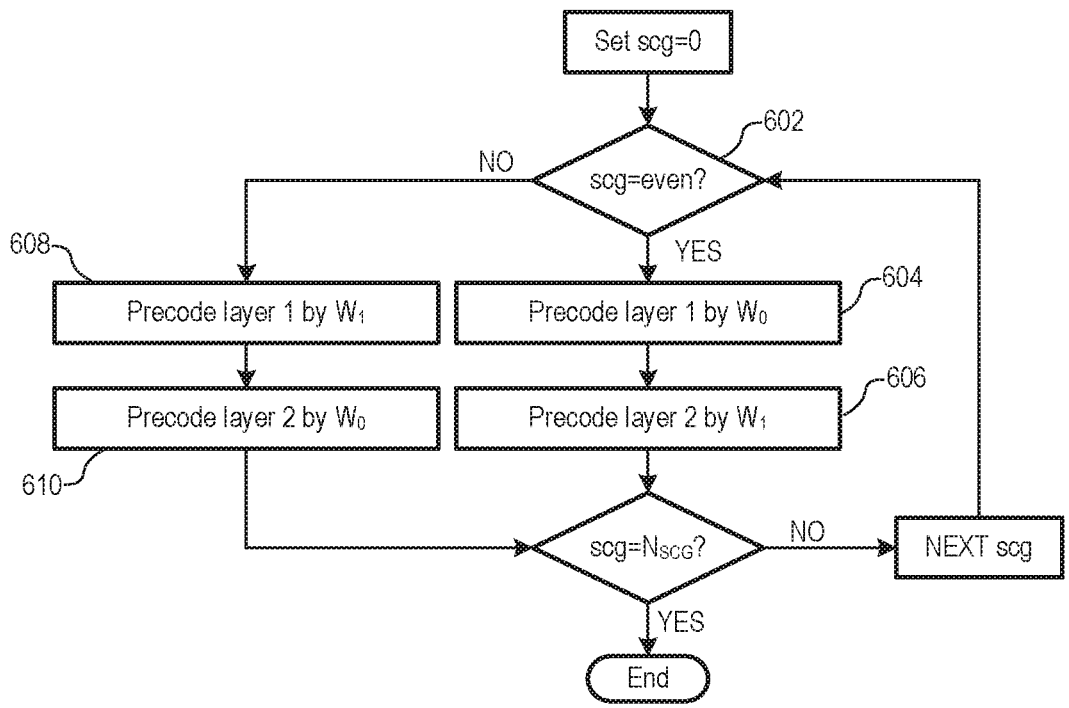
FIG. 6 is a flow chart showing steps of another process in accordance with a representative embodiment of the present invention.

As noted above, the weights estimated based on constructed channels tend to be inaccurate. In some embodiments, the orthogonal or quasi-orthogonal precoding weights, as estimated above, may also be inaccurate, with the result that the second (and other) downlink signal layers may have lower performance than the 1st downlink signal layer. FIG. 6 is a flow-chart illustrating a toggling technique that makes two (or more) downlink signal layers have similar precoding accuracy, experience similar channel conditions, and achieve similar performance.

In some embodiments, the frequency band allocated to a given UE for downlink transmission may be divided into frequency sub-bands represented in units of resource blocks (RB) or subcarriers (SC). These sub-bands may be referred to as subcarrier groups (SCGs). The number of SCGs in a frequency band allocated to the UE may be referred to as $N_{SCG}$. The untoggled precoding weights for dual downlink signal layers per SCG can be represented as:

$$W_{untoggled}(scg)=[W_0(scg)W_1(scg)],\ 0 \le scg \le N_{SCG}-1$$

where $W_0(scg)$ and $W_1(scg)$ are respective first precoding weights and orthogonal or quasi orthogonal precoding weights generated in each SCG, which may be calculated as described above with reference to FIG. 5.

A first downlink signal layer precoded by $W_0$ may have better performance than the second downlink signal layer precoded by $W_1$. Precoding weights toggling operates to swap the precoding weights applied to the two downlink signal layers in an alternating manner. In some embodiments, this toggling may be performed on a per-SCG basis. For example: when scg=even (at 602), the first downlink signal layer may be precoded by $W_0$ (at 604), and the second downlink signal layer may be precoded by $W_1$ (at 606); and when scg=odd (at 602), the first downlink signal layer may be precoded by $W_1$ (at 608), and the second downlink signal layer may be precoded by $W_0$ (at 610). This toggling may be summarized as:

$$W_{toggled}(scg) = \begin{cases} [W_0(scg)\ W_1(scg)], & scg \text{ is even} \\ [W_1(scg)\ W_0(scg)], & scg \text{ is odd} \end{cases}, 0 \le scg \le N_{SCG}-1$$

Figure 7:
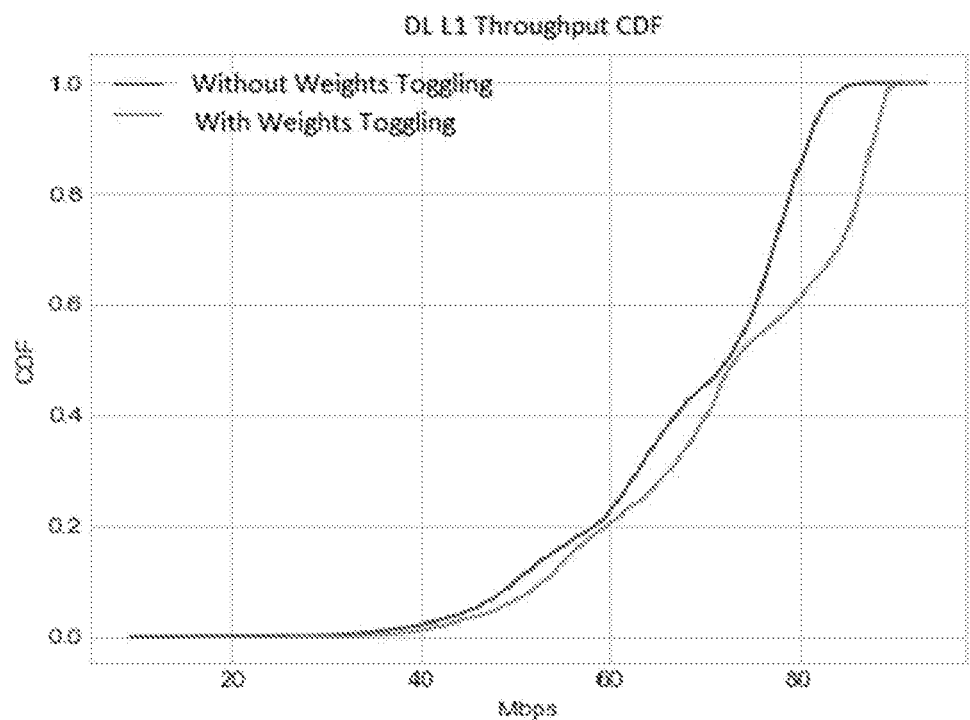
FIG. 7 is a chart illustrating a comparison between DL throughput obtain by a conventional technique vs. the methods of FIGS. 5 and 6.

The toggling method described above has been experimentally tested and found to produce a gain in over-the-air throughput. As may be seen in FIG. 7, for a cumulative distribution function (CDF) of 0.8, a throughput gain (in downlink signal layer 1) of approximately 10 Mbps is observed.

As may be appreciated, toggling of the precoding weights may be performed on a basis other than SCGs. For example, the precoding weights may be toggled in alternating physical resource blocks (PRBs) or alternating groups of PRBs, or in alternating transmission time intervals (TTIs), if desired.

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

The invention claimed is:

1. A method in a base station configured to transmit and receive wireless signals to and from a user equipment, UE, the method comprising:
   determining a downlink channel response of a first UE antenna, based on uplink signals received from the UE;
   calculating first precoding weights based on the determined channel response of the first UE antenna;
   generating orthogonal or quasi-orthogonal precoding weights based on the first precoding weights; and
   transmitting first and second downlink signal layers using the first precoding weights and the orthogonal or quasi-orthogonal precoding weights,
   the first precoding weights being calculated as:

$$W_0 = \frac{1}{\sqrt{2}}\begin{bmatrix} V \\ V\varphi_1 \end{bmatrix} = \frac{1}{\sqrt{2}}\begin{bmatrix} V & 0 \\ 0 & V \end{bmatrix}\begin{bmatrix} 1 \\ \varphi_1 \end{bmatrix},$$

where:
   V is a precoding weight of downlink signal layer per polarization indicative of the determined channel response of the first UE antenna; and
   $\varphi_1$ is a co-phasing factor of orthogonal polarizations of the base station transmit antennas.

2. The method as claimed in claim 1, wherein determining the downlink channel response of the first UE antenna comprises:
   measuring an uplink channel response based on the uplink signals received from the UE; and
   determining the downlink channel response as the reciprocal of the measured uplink channel response.

3. The method as claimed in claim 1, wherein generating the orthogonal or quasi-orthogonal precoding weights comprises generating quasi-orthogonal precoding weights as:

$$W_0 = \frac{1}{\sqrt{2}}\begin{bmatrix} V \\ -V\varphi_1 \end{bmatrix} = \frac{1}{\sqrt{2}}\begin{bmatrix} V & 0 \\ 0 & V \end{bmatrix}\begin{bmatrix} 1 \\ -\varphi_1 \end{bmatrix}.$$

4. The method as claimed in claim 1, wherein transmitting the first and second downlink signal layers comprises toggling the first precoding weights and the orthogonal or quasi-orthogonal precoding weights.

5. The method as claimed in claim 4, wherein a frequency band allocated to the UE is divided into a plurality of subcarrier groups, SCGs, and wherein toggling the first precoding weights and the orthogonal or quasi-orthogonal precoding weights comprises:
   in a first set of SCGs: precoding the first downlink signal layer using the first precoding weights, and precoding the second downlink signal layer using the orthogonal or quasi-orthogonal precoding weights; and
   in a second set of SCGs: precoding the first downlink signal layer using the orthogonal or quasi-orthogonal precoding weights, and precoding the second downlink signal layer using the first precoding weights.

6. The method as claimed in claim 5, wherein the first set of SCGs comprises even SCGs, and the second set of SCGs comprises odd SCGs.

7. The method as claimed in claim 4, wherein toggling the first precoding weights and the orthogonal or quasi-orthogonal precoding weights comprises:
   in a first group of one of more physical resource blocks (PRBs): precoding the first downlink signal layer using the first precoding weights, and precoding the second downlink signal layer using the orthogonal or quasi-orthogonal precoding weights; and
   in a second group of one of more PRBs: precoding the first downlink signal layer using the orthogonal or quasi-orthogonal precoding weights, and precoding the second downlink signal layer using the first precoding weights.

8. The method as claimed in claim 4, wherein toggling the first precoding weights and the orthogonal or quasi-orthogonal precoding weights comprises:
   in a first Transmission Time Interval (TTI): precoding the first downlink signal layer using the first precoding weights, and precoding the second downlink signal layer using the orthogonal or quasi-orthogonal precoding weights; and
   in a second TTI: precoding the first downlink signal layer using the orthogonal or quasi-orthogonal precoding weights, and precoding the second downlink signal layer using the first precoding weights.

9. A base station configured to transmit and receive wireless signals to and from a user equipment, UE, the base station comprising:
   at least one processor; and
   a non-transitory machine readable storage medium comprising machine readable software instructions configured to control the at least one processor to implement a method comprising:
      determining a downlink channel response of a first UE antenna, based on uplink signals received from the UE;
      calculating first precoding weights based on the determined channel response of the first UE antenna;
      generating orthogonal or quasi-orthogonal precoding weights based on the first precoding weights; and
      transmitting first and second downlink signal layers using the first precoding weights and the orthogonal or quasi-orthogonal precoding weights;
   the first precoding weights being calculated as:

$$W_0 = \frac{1}{\sqrt{2}}\begin{bmatrix} V \\ V\varphi_1 \end{bmatrix} = \frac{1}{\sqrt{2}}\begin{bmatrix} V & 0 \\ 0 & V \end{bmatrix}\begin{bmatrix} 1 \\ \varphi_1 \end{bmatrix},$$

where:
V is a precoding weight of downlink signal layer per polarization indicative of the determined channel response of the first UE antenna; and
$\varphi_1$ co-phasing factor of orthogonal polarizations of the base station transmit antennas.

10. A non-transitory machine readable storage medium comprising machine readable software instructions configured to control at least one processor of a base station to implement a method comprising:
determining a downlink channel response of a first UE antenna, based on uplink signals received from the UE;
calculating first precoding weights based on the determined channel response of the first UE antenna,
generating orthogonal or quasi-orthogonal precoding weights based on the first precoding weights; and
transmitting first and second downlink signal layers using the first precoding weights and the orthogonal or quasi-orthogonal precoding weights;
the first precoding weights being calculated as:

$$W_0 = \frac{1}{\sqrt{2}}\begin{bmatrix} V \\ V\varphi_I \end{bmatrix} = \frac{1}{\sqrt{2}}\begin{bmatrix} V & 0 \\ 0 & V \end{bmatrix}\begin{bmatrix} 1 \\ \varphi_I \end{bmatrix},$$

where,
V is a precoding weight of downlink signal layer per polarization indicative of the determined channel response of the first UE antenna; and
$\varphi_1$ is a co-phasing factor of orthogonal polarizations of the base station transmit antennas.

11. A method in a base station configured to transmit and receive wireless signals to and from a user equipment, UE, the method comprising:
determining a downlink channel response of a first UE antenna, based on uplink signals received from the UE;
calculating first precoding weights based on the determined channel response of the first UE antenna;
generating orthogonal or quasi-orthogonal precoding weights based on the first precoding weights; and
transmitting first and second downlink signal layers using the first precoding weights and the orthogonal or quasi-orthogonal precoding weights;
the first precoding weights being calculated as:

$$W_0 = H_0^{DL^H}\left(H_0^{DL}H_0^{DL^H} + \sigma^2\right)^{-1} = \begin{bmatrix} \dfrac{H_{0,p0}^H}{H_{0,p0}H_{0,p0}^H + H_{0,p0}H_{0,p0}^H + \sigma^2} \\ \dfrac{H_{0,p1}^H}{H_{0,p0}H_{0,p0}^H + H_{0,p0}H_{0,p0}^H + \sigma^2} \end{bmatrix}$$

where:
$H_0^{DL}$ is a downlink channel coefficient matrix indicative of the determined channel response of the first UE antenna;
$(\bullet)^H$ is the Hermitian function;
$H_{0,p0}$ and $H_{0,p1}$ are channel coefficients for the base station transmit antennas of respective orthogonal polarizations, the channel coefficients being indicative of the determined channel response of the first UE antenna; and
σ a is the standard deviation of noise vector n.

12. The method as claimed in claim 11, wherein generating the orthogonal or quasi-orthogonal precoding weights comprises generating orthogonal precoding weights as:

$$W_1 = \begin{bmatrix} \dfrac{-c*H_{0,p1}^H}{H_{0,p0}H_{0,p0}^H + c*H_{0,p0}H_{0,p0}^H + \sigma^2} \\ \dfrac{H_{0,p0}^H}{H_{0,p0}H_{0,p0}^H + c*H_{0,p0}H_{0,p0}^H + \sigma^2} \end{bmatrix}$$

where:

$$c = -\frac{H_{0,p1}^* H_{0,p0}}{H_{0,p0}^* H_{0,p1}};$$

$(\bullet)^*$ is complex conjugate operator.

13. A base station configured to transmit and receive wireless signals to and from a user equipment, UE, the base station comprising:
at least one processor; and
a non-transitory machine readable storage medium comprising machine readable software instructions configured to control the at least one processor to implement a method comprising:
determining a downlink channel response of a first UE antenna, based on uplink signals received from the UE;
calculating first precoding weights based on the determined channel response of the first UE antenna;
generating orthogonal or quasi-orthogonal precoding weights based on the first precoding weights; and
transmitting first and second downlink signal layers using the first precoding weights and the orthogonal or quasi-orthogonal precoding weights;
the first precoding weights being calculated as:

$$W_0 = H_0^{DL^H}\left(H_0^{DL}H_0^{DL^H} + \sigma^2\right)^{-1} = \begin{bmatrix} \dfrac{H_{0,p0}^H}{H_{0,p0}H_{0,p0}^H + H_{0,p0}H_{0,p0}^H + \sigma^2} \\ \dfrac{H_{0,p1}^H}{H_{0,p0}H_{0,p0}^H + H_{0,p0}H_{0,p0}^H + \sigma^2} \end{bmatrix}$$

where:
$H_0^{DL}$ is a downlink channel coefficient matrix indicative of the determined channel response of the first UE antenna;
$(\bullet)^H$ is the Hermitian function;
$H_{0,p0}$ and $H_{0,p1}$ are channel coefficients for the base station transmit antennas of respective orthogonal polarizations, the channel coefficients being indicative of the determined channel response of the first UE antenna; and
σ is the standard deviation of noise vector n.

14. A method in a base station configured to transmit and receive wireless signals to and from a user equipment, UE, the method comprising:
determining a downlink channel response of a first UE antenna, based on uplink signals received from the UE;

calculating first precoding weights based on the determined channel response of the first UE antenna;
generating orthogonal or quasi-orthogonal precoding weights based on the first precoding weights; and
transmitting first and second downlink signal layers using the first precoding weights and the orthogonal or quasi-orthogonal precoding weights;
the first precoding weights being calculated as:

$$W_0 = \begin{bmatrix} V_0 \\ V_1 \end{bmatrix}$$

where
$V_0$ and $V_1$ are the precoding weights for the first transmission layer over the base station transmit antennas of 1st polarization and 2nd polarization respectively.

15. The method as claimed in claim 14, wherein generating the orthogonal or quasi-orthogonal precoding weights comprises generating quasi-orthogonal precoding weights as:

$$W_1 = \begin{bmatrix} V_0 \\ -V_1 \end{bmatrix}.$$

16. A base station configured to transmit and receive wireless signals to and from a user equipment, UE, the base station comprising:
at least one processor; and
a non-transitory machine readable storage medium comprising machine readable software instructions configured to control the at least one processor to implement method comprising:
determining a downlink channel response of a first UE antenna, based on uplink signals received from the UE;
calculating first precoding weights based on the determined channel response of the first UE antenna;
generating orthogonal or quasi-orthogonal precoding weights based on the first precoding weights; and
transmitting first and second downlink signal layers using the first precoding weights and the orthogonal or quasi-orthogonal precoding weights;
the first precoding weights being calculated as:

$$W_0 = \begin{bmatrix} V_0 \\ V_1 \end{bmatrix}$$

where
$V_0$ and $V_1$ are the precoding weights for the first transmission layer over the base station transmit antennas of 1st polarization and 2nd polarization respectively.

\* \* \* \* \*

UNITED STATES PATENT AND TRADEMARK OFFICE
CERTIFICATE OF CORRECTION

PATENT NO. : 11,824,610 B2
APPLICATION NO. : 17/615630
DATED : November 21, 2023
INVENTOR(S) : Long et al.

Page 1 of 3

It is certified that error appears in the above-identified patent and that said Letters Patent is hereby corrected as shown below:

On the Title Page

Item (57), under "ABSTRACT", in Column 1, Line 5, delete "preceding" and insert -- precoding --, therefor.

Item (57), under "ABSTRACT", in Column 1, Line 7, delete "preceding" and insert -- precoding --, therefor.

Item (57), under "ABSTRACT", in Column 1, Line 8, delete "preceding weights." and insert -- precoding weights. --, therefor.

Item (57), under "ABSTRACT", in Column 1, Lines 9-10, delete "preceding" and insert -- precoding --, therefor.

Item (57), under "ABSTRACT", in Column 1, Lines 11-12, delete "preceding weights." and insert -- precoding weights. --, therefor.

On Page 2, item (56), under "OTHER PUBLICATIONS", in Column 1, Line 13, delete "May 2011." and insert -- May, 2011. --, therefor.

In the Drawings

In Fig. 5, Sheet 4 of 5, for Tag "506", Line 2, delete "wieghts" and insert -- weights --, therefor.

In the Specification

In Column 3, Line 39, delete "device (UE)" and insert -- (UE) device --, therefor.

In Column 7, Line 28, delete "cross-polarized)" and insert -- cross-polarized --, therefor.
In Column 7, Line 40, delete "$H_{UL}=[H_0^{UL} H_1^{UL} \ldots H_{M-1}^{UL}]$" and insert Signed and Sealed this
Fourteenth Day of May, 2024

Katherine Kelly Vidal
*Director of the United States Patent and Trademark Office*

CERTIFICATE OF CORRECTION (continued)
U.S. Pat. No. 11,824,610 B2

-- $H^{UL}=[H_0^{UL} H_1^{UL} \ldots H_{M-1}^{UL}]$ --, therefor.

In Column 7, Line 52, delete "$H_{sounded}^{UL}$Let" and insert -- $H_{sounded}^{UL}$. Let --, therefor.

In Column 8, Line 58, delete "$H_0^{DL}$" and insert -- $H_0^{UL}$ --, therefor.

In Column 8, Line 61, delete "antenna" and insert -- UE antenna --, therefor.

In Column 10, Lines 9-10, delete "$W_0 = \frac{1}{\sqrt{2}}\begin{bmatrix} V \\ V\varphi_l \end{bmatrix} = \begin{bmatrix} V & 0 \\ 0 & V \end{bmatrix}\begin{bmatrix} 1 \\ \varphi_l \end{bmatrix}$," and insert -- $W_0 = \frac{1}{\sqrt{2}}\begin{bmatrix} V \\ V\varphi_l \end{bmatrix} = \frac{1}{\sqrt{2}}\begin{bmatrix} V & 0 \\ 0 & V \end{bmatrix}\begin{bmatrix} 1 \\ \varphi_l \end{bmatrix}$, --, therefor.

In Column 10, Lines 16-17, delete "$W_1 = \frac{1}{\sqrt{2}}\begin{bmatrix} V \\ -V\varphi_l \end{bmatrix} = \begin{bmatrix} V & 0 \\ 0 & V \end{bmatrix}\begin{bmatrix} 1 \\ -\varphi_l \end{bmatrix}$," and insert -- $W_1 = \frac{1}{\sqrt{2}}\begin{bmatrix} V \\ -V\varphi_l \end{bmatrix} = \frac{1}{\sqrt{2}}\begin{bmatrix} V & 0 \\ 0 & V \end{bmatrix}\begin{bmatrix} 1 \\ -\varphi_l \end{bmatrix}$. --, therefor.

In the Claims

In Column 12, Line 21, in Claim 7, delete "of" and insert -- or --, therefor.

In Column 12, Line 26, in Claim 7, delete "of" and insert -- or --, therefor.

In Column 13, Line 5, in Claim 9, delete "$\varphi_1$" and insert -- $\varphi_1$ is a --, therefor.

In Column 13, Line 15, in Claim 10, delete "antenna," and insert -- antenna; --, therefor.

In Column 13, Line 28, in Claim 10, delete "where," and insert -- where: --, therefor.

In Column 13, Line 67, in Claim 11, delete "σ a" and insert -- σ --, therefor.

In Column 14, Lines 15-16, in Claim 12, delete "$c = -\frac{H_{0,p1}^* H_{0,p0}}{H_{0,p0}^* H_{0,p1}};$" and insert -- $c = -\frac{H_{0,p1}^* H_{0,p0}}{H_{0,p0}^* H_{0,p1}};$ and --, therefor.

In Column 15, Line 15, in Claim 14, delete "where" and insert -- where: --, therefor.

In Column 16, Line 24, in Claim 16, delete "where" and insert -- where: --, therefor.